(12) United States Patent
Langlotz

(10) Patent No.: US 11,212,451 B2
(45) Date of Patent: Dec. 28, 2021

(54) DIGITAL CAMERA ZOOM CONTROL FACILITY

(71) Applicant: Bennet K. Langlotz, Dallas, TX (US)

(72) Inventor: Bennet K. Langlotz, Dallas, TX (US)

(73) Assignee: BULLETPROOF PROPERTY MANAGEMENT, LLC, Cheyenne, WY (US)

( * ) Notice: Subject to any disclaimer, the term of this patent is extended or adjusted under 35 U.S.C. 154(b) by 0 days.

(21) Appl. No.: 17/080,985

(22) Filed: Oct. 27, 2020

(65) Prior Publication Data

US 2021/0044755 A1    Feb. 11, 2021

Related U.S. Application Data

(63) Continuation-in-part of application No. 16/689,985, filed on Nov. 20, 2019, now Pat. No. 10,868,965.

(60) Provisional application No. 62/873,790, filed on Jul. 12, 2019.

(51) Int. Cl.
*H04N 5/232* (2006.01)
*H04N 5/225* (2006.01)

(52) U.S. Cl.
CPC ....... *H04N 5/23296* (2013.01); *H04N 5/2254* (2013.01)

(58) Field of Classification Search
None
See application file for complete search history.

(56) References Cited

U.S. PATENT DOCUMENTS

| | | | | |
|---|---|---|---|---|
| 9,261,756 | B2 * | 2/2016 | Kuroiwa | G02B 7/14 |
| 10,627,704 | B2 * | 4/2020 | Tamura | G03B 17/56 |
| 2005/0025472 | A1 * | 2/2005 | Sugita | G03B 17/14 |
| | | | | 396/71 |
| 2013/0021686 | A1 * | 1/2013 | Uehara | G02B 7/102 |
| | | | | 359/827 |
| 2020/0029018 | A1 * | 1/2020 | Kawai | H04N 5/23241 |

* cited by examiner

*Primary Examiner* — James M Hannett
(74) *Attorney, Agent, or Firm* — Bennet K. Langlotz; Langlotz Patent & Trademark Works, LLC

(57) ABSTRACT

A camera system with a body including an imager, a zoom lens having a variable focal length and a zoom control operable to adjust the focal length. The body may include a controller connected to the lens and configured to detect the focal length of the lens, and operable based on the focal length of the lens to establish a digital zoom factor. The digital zooming may occur in a limited portion of the zoom range, and this may be the upper end of the zoom range.

20 Claims, 13 Drawing Sheets

DIGITAL CAMERA ZOOM CONTROL FACILITY

CROSS-REFERENCE TO RELATED APPLICATIONS

This application is a Continuation-in-Part of U.S. patent application Ser. No. 16/689,985 filed on Nov. 20, 2019, entitled "Digital Camera Zoom Control Facility," which claims the benefit of U.S. Provisional Patent Application No. 62/873,790 filed on Jul. 12, 2019, entitled "Camera Facility for Autofocusing with Manual focus lenses, and Digital Camera Zoom Control Facility," which are hereby incorporated by reference in their entirety for all that is taught and disclosed therein.

FIELD OF THE INVENTION

This invention relates to digital cameras, and to enhancing performance and capabilities with legacy and modern lenses.

BACKGROUND OF THE INVENTION

Lenses for digital cameras are produced with autofocusing capability. This normally involves a motor in the lens that adjusts the focus mechanism of the lens based on feedback from a sensor in the camera that indicates a point of focus. With modern cameras, this normally is based on the main image sensor and how a processor analyzes the generated digital image to infer a desired focus location, and then to optimize sharpness of the image at that location. Some systems have a motor in the camera that mechanically interacts with a focus mechanism in the lens.

Lenses with autofocus capability may have greater weight, bulk, and cost compared to manual focus lenses. More importantly, there is an ample inventory of optically and mechanically excellent legacy lenses in the possession of users or in the used market that have low value because of the lack of the desired auto-focus feature.

Also, lenses are required to be deployed on cameras with different mounts and different image plane locations relative to the mount. This necessitates adapters for some applications, and adapters have limitations and disadvantages including inadvertent disconnection, and a poorly integrated appearance that impairs perceived value.

Other cameras have focus peaking systems that are useful but have limitations if the sensitivity is to low or too high for different scenes.

Other systems have excellent image quality that facilitates image cropping within reasonable limits, but these limits may be different for different conditions. Image cropping after shooting limits the ability to compose images, but conventional digital zoom functions can violate image quality inadvertently, and require complex and unergonomic control to invoke, especially with optical zoom lenses.

Accordingly, there is a need for a camera with a mount configured for attachment of a manually focused lens having a focus function adjustable through a range of focus positions. The camera may have an electronic image sensor configured in registration with the mount, a processor connected to the sensor and operable to receive image data from the sensor, and the processor may be responsive to image data indicating a changing focus position to record a sequential plurality of images during an interval.

There may also be a need for a camera system with a body including an imager, a zoom lens having a variable focal length and a zoom control operable to adjust the focal length. The body may include a controller connected to the lens and configured to detect the focal length of the lens, and operable based on the focal length of the lens to establish a digital zoom factor. The digital zooming may occur in a limited portion of the zoom range, and this may be the upper end of the zoom range.

The limitations of the prior art are addressed by providing a camera system with a body including an imager, a zoom lens having a variable focal length and a zoom control operable to adjust the focal length. The body may include a controller connected to the lens and configured to detect the focal length of the lens, and operable based on the focal length of the lens to establish a digital zoom factor. The digital zooming may occur in a limited portion of the zoom range, and this may be the upper end of the zoom range.

DETAILED DESCRIPTION OF A PREFERRED EMBODIMENT

Manual focusing embodiment.

Figure 1:
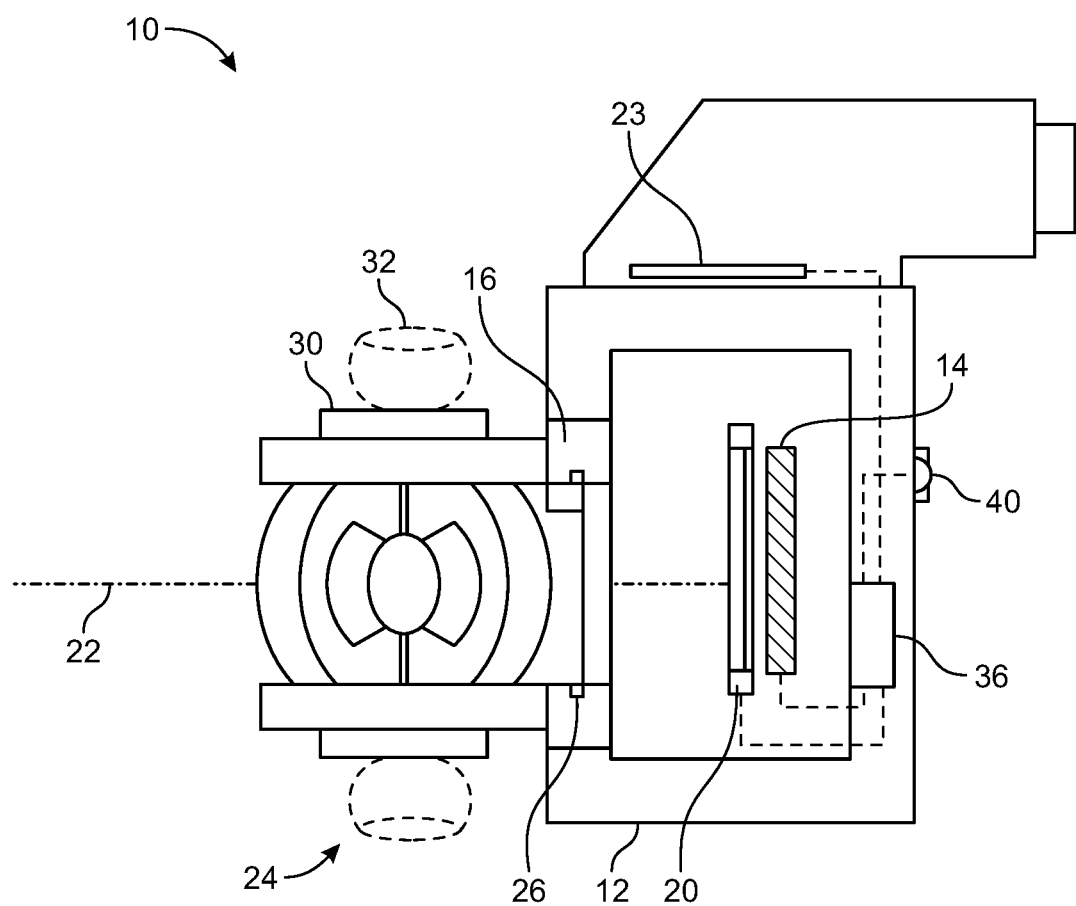
FIG. 1 is a simplified schematic view of a camera system.

FIG. 1 shows a camera system according to a preferred embodiment of the invention.

A camera 10 has a housing 12 that includes an image sensor 14 and a body mount 16. A shutter 20 is positioned forward of the lens in registration with the sensor, which is registered with the body mount that is concentric with an optical axis 22. A finder or display 23 displays an image to the user.

A lens 24 has a lens mount 26 that removably couples to the body mount. The lens is a manual focusing lens that operates by rotation of a focus collar 30 engaged by a user's fingers 32.

The camera has a processor 36 that includes image and data processing and storage capabilities, and is connected to the sensor, shutter, finder, and display, as well external user-actuatable switches 40. The processor is shown schematically as a block, but it an interconnected network of components, switches, and circuitry, and includes stored firmware, software, and images generated by the camera on connected memory cards.

The camera is preferably a modern digital camera such as a Nikon Z7 or Canon EOS R, Sony A9, or Fujifilm GFX100, but may be any DSLR or smart device with a camera capable of receiving a detachable lens. This may include cases and adapters configured to mount lenses in registration with mobile phone cameras. Also included are cameras that can generate video.

The lens may be any lens with a focusing capability either by movement of the whole lens or more typically by rotation of a focus ring or collar 30. Astronomical telescopes, binoculars, and spotting scopes are also considered focusable lenses for this purpose. Camera lenses made for SLR cameras in the era before autofocusing capabilities are considered the most typical selection for this purpose.

The camera body has a wide range of capabilities associated with the processor and connected elements. Many of these capabilities are existing and well known in the prior art, and are employed here in novel ways.

The processor can determine whether or not the image on a selected location of the sensor is "in focus". This capability is used to send signals to an auto focus lens to adjust the lens focus until focus is achieved. With a manually-focused lens attached, the sensor cannot change the focus of the lens, but it can "know" whether the image at the selected location is in focus. In the prior art this enables the camera to delay shutter actuation when the shutter release is depressed until a focused image is achieved, such as when a shutter refuses to trigger when an auto-focus lens is unable to achieve focus, and the system delays release until focus is detected. It also enables the display to indicate with lights whether a manual-focus lens is in focus, and if out of focus in which direction, enabling the user to adjust accordingly until the in-focus light is lit.

In newer cameras, the display has a "focus peaking" functional that indicates with colored highlights the areas that the processor has determined are in focus to let the user adjust manually the focus of a lens. This may be provided by the processor setting a threshold of contrast levels between adjacent or nearby pixels, and highlighting those areas that are contrasty or have rapidly varying signals as in-focus areas tend to have. An improvement to focus peaking is discussed below.

The camera may also be provided with the ability to determine in a scene which is a presumed subject and desired point of focus, such as by locating faces, facial features, nearest objects, and the like, and making assumptions based on photo composition and past patterns of photography.

The camera may also be provided with the ability to determine for a given location whether the focus setting is changing, in what direction the setting is changing (nearer or father, toward focus or away from focus) and to distinguish changing focus from a moving subject. The camera may be able to determine a rate of focus change (rapid vs. slow), an acceleration of focus rate (quickening focus rate vs. slowing—corresponding to an increasing rate of manual focus ring rotation vs. decreasing). The camera may determine whether cessation of focus change was gradual, such as by a user simply stopping turning the ring, versus a "hard stop" as occurs when the focus hits a limit of rotation.

Existing cameras have the ability to take a rapid sequence of images, sometimes 10-20 frames per second for professional DSLRs, or more when one includes video capabilities to generate images at rapid frame rates.

Existing cameras also have the ability of "focus bracketing" "focus stacking" or "focus shift". With this, the feature instructs the camera to take a series of pictures with the lens' focus distance setting increasing between each image captured until the specified number of images are captured or until infinity focus is reached. The resulting set of images can then be focus stacked during post-processing with the result being an increased depth of field, potentially by a significant amount, while avoiding the softening effects of diffraction caused by very narrow apertures use.

This technique is commonly used in macro photography as the depth of field is typically extremely shallow at very close focus distances. Landscape photographers frequently use this technique to keep entire scenes that include a close foreground subject in focus. The feature is intended for applications such as studio product photography to create an unlimited depth of field as software subsequently combines the sharpest sections of each image to generate a resulting image.

In the above processes, the camera processor responds to a signal from the user (such as actuation of the "shutter release" button) to initiate a process in which the processor controls the lens focus setting. It is believed that in these instances of existing imaging sequences, the lens focus setting is stopped at each setting for imaging, and changed only between images. Even if in some high-speed processes at the limits of capabilities the images were generated while the lens focus setting was actively being changed, the focus settings, range of focus change, rate of focus change, and all other focus characteristics are controlled by the processor as the lens is operated without contact or direct control by the user.

In the preferred embodiment, the processor has no operational connection to or control over the manual lens focus setting. All aspects of the lens focus setting (range and rate of change, etc.) are controlled by the user manually. The system operates to record a rapid sequence of images as the user manually moves the lens focus through a range of settings. This means that some or all of the images are captured while the focus setting is changing. After this sequence of images is captured, they may be saved as separate images for the user to inspect and select from.

In some embodiments, the processor may be selective in which images are saved. It may analyze each image to determine if a selected location is adequately in focus or not, and flag, accept, save, reject or delete based on whether this threshold is met. As with more complex focusing capabilities, it may determine if any image meets other criteria for focus such as are employed when determining whether an auto-focus lens system is adequately in focus to trigger the recording of an image.

Multiple images determined to have potentially desirable focus settings may be saved, and this number may be limited to a selected number, or only the best presumed focus image may be selected for storage. Multiple images with in-focus areas may be saved for later processing or processed in camera to generate a focus stacked image based on user-focused multiple images. Images with no likely subjects (or any focused areas at extremes of defocus) may be rejected and deleted from a buffer to save storage space and increase speed.

An extreme embodiment that is impractical with current technical limitations would be a video camera that simply records video continuously as a user may aim it at different subjects, and manually sweep the focus of the lens (or with a lens that is continuously cycling through a range of focal distances). This would generate potentially thousands of images per minute of operation, creating impractical burdens on power consumption, processing capacity, storage capacity, as well as user time to evaluate and select resulting images. Many of these factors are compounded at higher image resolutions where the critical focus demands of the preferred embodiment are most desired.

Therefore, the system preferably has the means to determine when the user desires to initiate generation of an image, and then generates a set of images as the user adjusts the focus. This may simply be done by recording images while the shutter release button is depressed, as might be done with existing cameras when a user might shoot a sequence of rapid-fire images by holding down the button to start and continue shooting, and releasing when done, with this sequence being shot while adjusting the focus. This may require unusual user skill and dexterity, as well as being potentially wasteful at shooting excessive images.

Preferred alternatives to trigger or otherwise determine when imaging commences may use other techniques. A selected motion by the user of the manual focus collar may be detected by the sensor and analyzed by the process to determine that a sequence of shots is desired. In simple terms, the system may record an image any time anything is determined to be in focus. For more practical applications the system should recognize that a user input indicating enablement, or that a shot is framed, and the user is ready to capture the image when the subject is in focus. This may include depressing the shutter release fully or part way, or a second button may be programmed for enablement. One embodiment would have one enabling button pressed to establish the shooting mode, and the shutter release pressed to initiate a "fire when ready" status in which the camera triggers images or a sequence when image conditions are met. The enabling button may be on the lens, or on a lens adapter as will be described below for cameras having this feature and also requiring an adapter, while the adapter is not needed for other cameras that are unable to offer this focusing capability.

When enabled, the system may respond by initiating a sequence in response to detecting any changing focus condition that implies a manual focus adjustment by the user, essentially "waking up" the system. The system shoots a sequence regardless of the focus characteristic of the images after some focus changes are detected, because the system presumes that the user is now racking the focus to sweep through the desired focus distance. The sequence may stop after a preselected time, or after a preselected number of images are captured, or when the user is detected to have stopped adjusting the focus and the system detects no change in the focus. It may also stop when the shutter button or other manual control button is released. It may also stop when the sensor and processor (using vibration reduction capabilities) detect a rapid shift in the image that is consistent with the user lowering the camera from his eye. The sequence may also stop when the processor determines that an image with sharp focus in a selected location has been achieved ("mission accomplished").

The system may also respond to patterns of manual focus detected by the sensor and processor, such as a cycling of the focus back and forth through a desired range, optionally at a selected frequency that is set for each user in the manner of programming double-click speed in a computer mouse. A user might rotate the collar left-right-left-right with one second per cycle until the system responds with a sound, light, or audible shutter at which the user might slow the adjustment rate and zero in on the range of desired focus.

Other user inputs vis the focus ring might be tapping it at either focus limit with the camera system detecting either the visual results using in body image stabilization (IBIS), or the acoustic or mechanical impulses. Further alternatives for communicating to the camera's processor via a mechanical lens having no electronic components may include strain gauge or other force sensors at the camera's mount that detect the slight torque applied to the mount due to the friction of the focusing of the lens, or as mechanical focus stop limits are reached.

Further embodiments may require voice control for enabling shooting, commencing a sequence, or ending a sequence. Others maybe include triggering a shot or sequence of shots as a subject or the camera is moving, even the focus ring is not being adjusted. Still other triggers may include the camera's level sensor so that shooting is blocked in the manner that autofocus prevents release until the focus is satisfied, but with level being the criterion to enable shooting.

Another embodiment may be used to reduce image size and memory and bandwidth resources. A master or "establishing shot" full-area image may be captured with approximate focus, while a limited area associated with a presumed or selected subject are shot in a sequence of different focus settings (whether manual or automatic). The best of these insets is knit into the larger full-area image. Other ways to conserve resources include capturing only luminance or high-contrast information while relying on the master for color data that does not require as high resolution, or which can be used to colorize or paint the image at the sharpest areas.

The key to this is capturing only a limited area for the shifter focus shots. This assumes limitations on capture and storage that make taking 10 or 100 images of 100 mpx still impractical but plenty of post processing resources, whether in camera or later in app.

Another alternative for triggering shutter release or a sequence of releases when a shot is inferred by the controller to be intended is a mode that waits and monitors the VR accelerometers and readies to shoot, triggering when it detects the camera hand held steadily pointed at something in the manner of a user who steadies the camera when a shot is desirably framed.

Also, when the camera has several shots recorded and makes preliminary or final decisions of which shots to discard, retain or select, the jpg file size may be a source of information indicating whether image is more or less blurry (blurry images being more readily compressed for small file sizes than sharper images). This has limited application in instances in which a subject may be shot against a detailed background that is desired to be blurry.

Non-CPU Lens Data Change for Zoom Lenses.

An independent feature may be provided for manual zoom lenses to adjust the vibration reduction (VR) or IBIS and other operational functionality to be in proportion to the focal length setting of the zoom. The focal lengths of fixed focal length legacy or manual lenses are normally entered as non-CPU data for this when the lens does not electronically identify itself to the camera. For zoom lenses with this feature, one or preferably both focal length extremes are entered manually into the camera, and then the image processor analyzes the changing scale of the image from extremes inferred by a hard stop of image scale as limits are reached. A user may recalibrate this by occasional full range zooming to one of both extremes to continue to recalibrate the VR setting. The camera may offer an occasional reminder for this calibration, and a standard practice may be for the user to select a "home" position to pause the lens when not shooting so the camera has a presumed initial reference focal length.

The invention may be a camera comprising a mount configured for attachment of a manually focused lens having a focus function adjustable through a range of focus positions, an electronic image sensor configured in registration with the mount, a processor connected to the sensor and operable to receive image data from the sensor, the processor responsive to image data indicating a changing focus position to record a sequential plurality of images during an interval.

The invention may be including the processor operable in response to cessation of changing focus position to conclude recording the sequential plurality of images.

The invention may be including an external switch operable by a user, and wherein the processor is enabled to record the images in response to an actuation of the external switch.

The invention may be wherein the processor is operable to analyze the plurality of images and to cease recording in response to a determination that at least one of the images is adequately in focus.

Digital Zoom Control.

Digital zooming is a familiar feature of consumer pocket cameras and smartphone cameras, but some users opt to switch off this feature that generates what is often a disappointingly low resolution and low-quality image caused by overmagnification beyond desired quality limits. Unlike true optical zoom lenses, digital zooming simply crops and discards part of the image. Such cameras have adequate but not excessive resolution for uncropped images, and often lack the surplus resolution needed to make digital zoom or cropped images of desired quality. For these purposes, "digital zoom" and cropping (potentially with fully- or partially-enlarged viewfinder display of the cropped and retained image) are considered synonymous and interchangeable.

More advanced modern cameras enjoy a surplus of resolution and this surplus will inevitably continue to increase. A Nikon Z7 has an image width of over 8000 pixels even as an image of less than 2000 pixels wide is considered high enough resolution for many uses including web display and printed photo books. Given this, an advanced camera may be made with digital zoom just as consumer pocket cameras have long had, to enable digital zooming to make (for example) a 35 mm fixed focal length lens effectively a 35-140 mm zoom. Where sharpness is more critical, a 4000-pixel wide image may be generated with the lens functioning as a 35-70 mm zoom lens. This presumes that the lens optical quality and other factor support the cropping without quality compromise, which is sometimes but not always the case.

Sometimes conditions allow such digital zooming, and sometimes they don't. Even if implemented, the problem remains how to avoid generating images below a desired quality standard. Past bad experience with excessive digital zoom can lead users to distrust digital zoom capabilities, and thus to defeat a system and miss its often-available composition benefits in modern high-resolution cameras. Digital zoom amounts can be set to a lower magnification, but sometimes this is needlessly low, and other times still too high to generate images of a desired quality.

An existing approach is to defeat digital zoom and crop later only to a degree permitted by the subsequently-realized image quality. When digital zoom is not defeated, the user risks zooming (i.e. cropping) excessively beyond reasonable limits without realizing that the generated image would be unacceptably low resolution, and lacking any way to gather and restore peripheral image areas to provide a lower-magnification image of tolerable quality.

The approach of defeating and later cropping lacks the benefit of composing a framed image and leads to wasted bandwidth as peripheral areas are needlessly recorded. Bandwidth can be an enhanced concern with bracketing techniques that capture multitudes of images in order to generate an optimal one, including the multi-image focus technique disclosed above.

Defeating digital zoom and later cropping also lacks the benefit of magnifying the zoomed-in image so that not only framing but other visual characteristics are more readily visualized. These characteristics may include focus, facial expression, action timing, lighting and any other subtle elements that might not be noticed or discerned with insufficiently magnified in the camera display. When the user can't readily see the subject, images suffer.

The preferred embodiment of the invention provides an advanced digital zoom that avoids generation of images that are below a desired image quality standard while enabling a natural zooming effect for the user in composing the image.

To provide benefits beyond merely adapting an advanced camera with a detachable lens to employ conventional digital zoom capabilities, the preferred embodiment of the invention analyzes any of numerous settings and factors that determine image quality, and/or may analyze actual image data to determine an image quality standard under the present conditions and settings. This essentially determines the amount of magnification the scene may tolerate while remaining within the user's quality standards. Notably, the principles may be employed in other cameras, including consumer pocket cameras, fixed lens cameras, and smart device cameras.

The image quality standard or threshold may be established any of several different ways. Although there may be other measures of image quality, the term "sharpness" is used as a general term that may include actuance, resolution, lack of noise or grain, lack of artifacts, lack of camera motion blur, lack of subject movement blur, and even factors that are sometimes traded off for sharpness like motion blur and depth of field, as well as precision of focus. Other factors may include atmospheric conditions (e.g. intervening haze), lighting direction (e.g. glare from shooting into a light source), and innumerable factors that may be discerned by the processor from an image generated on the sensor or from the camera or lens settings.

The source data used may be setting based, with the processor using a function of various known device settings (e.g. aperture, shutter speed, focal distance, ISO/sensitivity, stabilization on/off, stabilization activity level). This does not require the processor to analyze the image itself.

Alternatively, or in addition, the processor may respond to the generated image itself, such as analyzing mathematical functions that indicate contrast and large illumination differences between adjacent pixels as are understood to be conventionally used in autofocus and other functions such as image stabilization. Any camera system or function that assesses image quality (e.g. as autofocus assesses whether or not an image in focus) may contribute to the image quality level established by the processor.

In a simplest embodiment, the estimated image quality may be based on scene brightness or exposure level. The brighter the scene, the less grain, less motion blur, and greater depth of focus—generally speaking. Essentially there is more light to work with without compromising image quality. For a given brightness there will be an array of workable settings for aperture, shutter speed and ISO. If a user (or a program mode of the camera) selects a sensible balance of these settings, the quality will generally be optimized for that brightness. If there is a significant departure from norms (such as unnecessarily high ISO with unnecessarily fast shutter and/or small aperture) then the system may recognize and adjust accordingly to establish an assumed or estimated quality level. In more advanced embodiments, each of the many potential settings or sensed levels may be used to inform an algorithm that calculates a presumed quality level.

Once a quality level under current conditions, settings, or sensed image is established, the processor then sets limits on digital zooming based on the established quality level. Zooming limits may be implemented in a number of different ways. One or more of these ways may be available for a given camera, and there may be user settings to select among different modes and different degrees of quality sensitivity.

The system may simply establish a limit based on a single quality threshold, and prevent any control input from zooming beyond that limit. The limit may be adjusted up or down from a nominal level based on a user-entered quality level (e.g. "Low, Medium, High"), or based on intended use "web publishing, magazine, mural, etc."

The quality limit may be implemented as a "stop" beyond which zooming does not continue, or it may allow zooming but with user feedback to create awareness of exceeding the limit. For example, an indicator may display green for high quality, yellow for medium and red for low. Or, as existing systems using a pair of buttons for zooming in or out will stop zooming in when optical zoom limits, and require the button to be released and re-pressed to continue with digital zoom, the system may require a deliberate second input to go past a quality limit. This could also be implemented with alternative indicators that may be audible or tactile, including electronic or other tactile detent or resistance effects on a programmable lens control ring.

The system may simply be informational and not put any limits on operation. A basic example would involve a green/yellow/red indicator of image quality as noted above. This may be more effective with ergonomic approaches that might frame the display with a quality-indicating color.

Users with a fixed focal length lens, such as those with programmable control rings, will always know when they are trading off quality for magnification with digital zooming because any zooming is digital zooming. But because it may be useful for users of zoom lenses to know when they have invoked digital zooming to extend beyond the optical zoom capacity of the lens, there is preferably a noticeable threshold indicator that digital zooming is invoked. This may occur in the display by measures such as shrinking the display by a nominal amount such as 10% and optionally by framing the displayed image with a color-indicating frame that may indicate the degree of quality as noted above. This marginal reduction in display size may alternatively be used to indicate when a quality threshold is being violated as opposed to when digital zooming begins.

Reducing the displayed image proportionally to the zooming would be a clear indicator but have the disadvantage of making it difficult to see the subject, verify focus and exposure, and compose the image, thus sacrificing one of the benefits of the system. One option is to make the displayed image reduction a function of the digital zoom degree, even if not a direct or proportional function. A minimum usable display image size might be established. For example, a half-size displayed image might be adequate for composition and used as the extreme limit to indicate tolerable-quality zooming (such as 2× or 5× or 10×) under ideal quality conditions, with intermediate zoom settings being displayed with proportional display size reduction between full size and the half-size limit.

This need not be a linear function, but the image size might be kept near a large amount such as 90% for the best quality range with the shrinkage rate providing a noticeable and intuitively alarming indicator of quality loss. Note that reduced images to indicate extreme zooming may be more tolerable that it would first appear because the source image is of increasingly degraded quality and displaying at full magnification would be excessive.

If the user has a hard time seeing a reduced-size displayed image in this system, the user would know that the image will be of low quality. Viewability gives an intuitive indicator of quality—if you can't see it well, you probably won't want to anyway. Along these lines the image may be full size or nearly full-size for a "green" range, slowly reducing for "yellow" and quickly reducing for "red". The system might alternatively have full size image display for the green range, a proportionately reducing size for yellow, and a selected limit (e.g. 50%) of reduced size for red. Note that as image size is reduced, the peripheral region available for a framing indicator increases, so that a widening red frame provides intuitive indication of worsening quality and discourages excessive digital zooming.

The system may offer the user a selection of functions from among these capabilities, as well as overrides (such as showing the display at full size in response to pressing a programmed button on the camera even when quality limits are exceeded).

Digital Zoom with Optical Zoom Lens Controls.

While a fixed focal length lens may be controlled intuitively even by a single control ring programmed to provide a zoom function, a lens with optical zoom capabilities presents a different challenge. The optical zoom is normally a mechanical function with what is understood to include a position encoder to transmit focal length setting information to the processor of the camera. To extend the optical zoom range with a digital zoom enabled by the above beneficial limits or warning indicia according to alternative embodiments of the invention, there are several alternatives.

A second control ring may be used to provide added digital zoom. This may be disabled until the optical zoom is maximized. A disadvantage is that it requires moving the user's hand from one control ring to another to continue zooming. Similarly, two control buttons may be programmed to provide digital zoom in and out functions in addition to the optical zoom.

Alternatively, for conditions when only maximum high magnifications are desired, a selection may be made by the user to invoke a "max-zoom" range that magnifies to the established quality limit at all optical zoom focal lengths so that the single mechanical optical zoom control provides a zoom range from maximum down to a digitally zoomed minimum. For example, a 70-200 mm zoom might under conditions tolerating a 2× digital zoom be operated as a 140-400 mm zoom with 2× digital zoom employed at all times. This digital zoom factor might be adjustable by the user with a camera control or menu entry. This may be considered as a "digital adjustable teleconverter."

Figure 2:
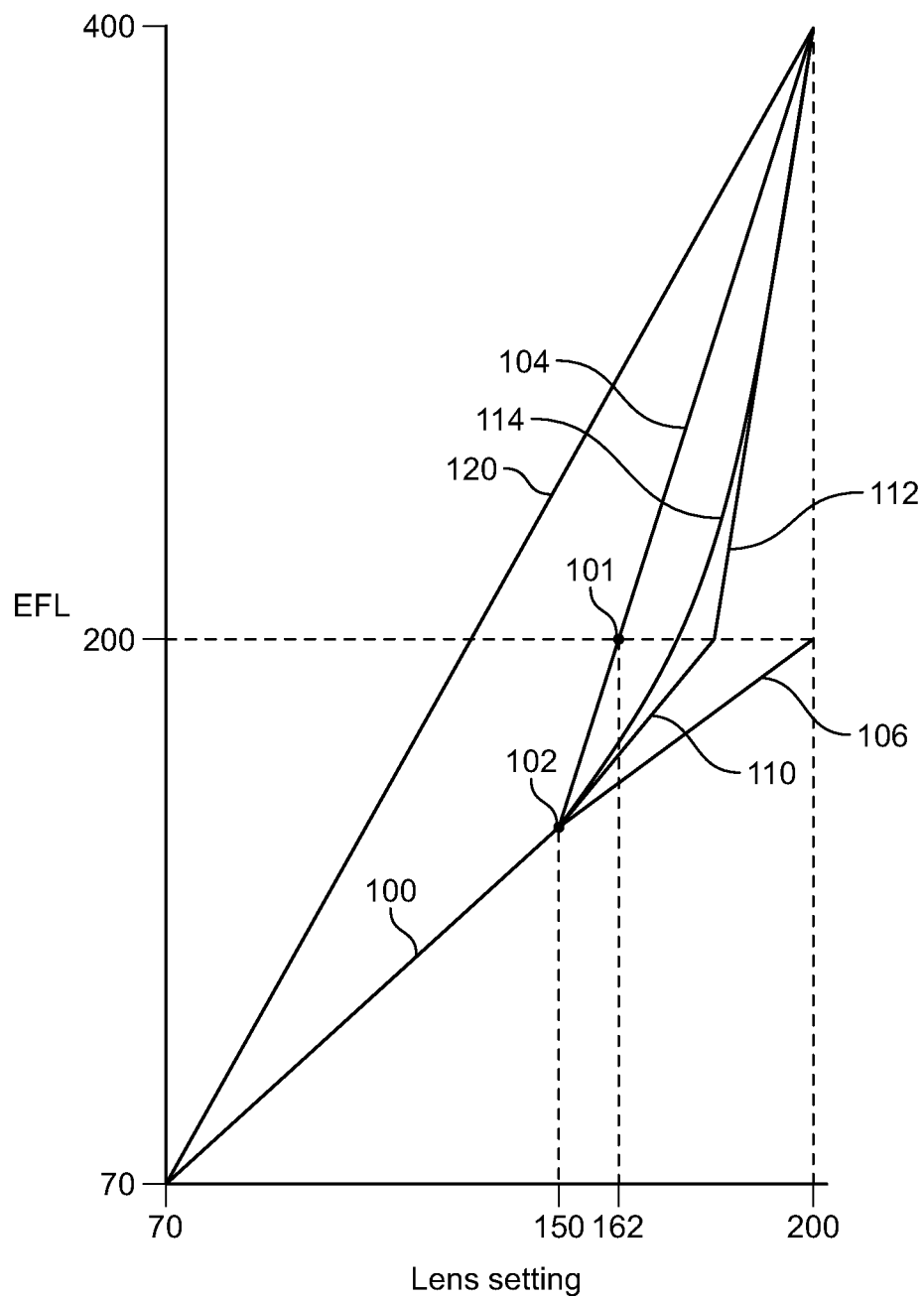
FIG. 2 illustrates a graph with focal length functions in a lens setting.

FIG. 2 shows a graph illustrating various functions of how effective focal length as digitally zoomed maps to a zoom lens actual optics zoom setting.

The second embodiment is embodied in a camera according to FIG. 1, except that FIG. 2 shows a graph illustrating various functions of how effective focal length (as digitally zoomed) maps to a zoom lens' actual optical zoom setting based on the control ring.

As many lenses have programmable control rings, the system preferably employs one control ring as the zoom ring. Even for a fixed focal length lens, a single ring may more usefully be used as a zoom ring to transmit to the camera's processor the intended zoom amount or focal length, which proportionately crops the image and enlarges the display to reflect the image that will be generated.

One basic system for an optical zoom lens is for the optical zoom ring to provide the sole input for optical and digital zooming, with the total zoom factor being based solely on the optical control ring position. In this basic system, the digital zoom function will operate within established quality limits by having no digital zoom at a bottom portion of the optical zoom range, and the maximum limit zoom at the top end, with digital zooming proportional to control ring position at all zoom settings above the minimum. Thus, for a 70-200 mm optical zoom lens, in conditions in which a digital zoom factor of 2× is the quality limit, the system would provide an effective focal length (EFL)—after digital zooming—of 70 mm with a lens optical zoom setting of 70 mm (no digital zoom), 400 mm (2× digital zoom) with a lens setting of 200 mm, and at 135 mm (the midpoint of the range), an EFL of 135×1.50=202.5 mm. The digital zoom degree in this system is proportional to the amount by which the optical zoom setting exceeds the minimum zoom setting as a percentage of the total zoom range.

While intuitive and effective, this proportional digital zoom approach indicated by line 120 in FIG. 2 has the disadvantage of needlessly reducing the image quality (though within tolerated quality limits) overall, but the shortest focal length zoom setting. For instance, in the 135 mm example, the user would invariably prefer to use the 200 mm optical zoom setting with no cropping (digital zooming) instead of being forced to crop the 135 mm image to a 200 mm framing. At all but the shortest focal length, sensor area and pixels the user invested in are going unused.

Therefore, it is preferable in many applications for the system to be provided with an optional setting in which the digital zoom range (from zero to a quality-established upper limit) is invoked only in a limited upper portion of the lens zoom range. This allows the lens to transmit focal length information to the camera (or the camera may use image analysis to estimate such information in a manual lens lacking data transmission from lens to camera). For a lower portion—preferably a major potion—of the zoom range, no digital zoom is invoked. Only in a minor upper portion of the range is the digital zoom proportionately added to the mix, from zero digital zoom at a transition point to max (tolerable based on quality limits) zoom at the lens' maximum focal length.

An example of this for the 70-200 lens might have no digital zoom until the optical focal length reaches a pre-established transition point of 150 mm (point 102 in the graph of FIG. 2), at which setting the tolerated 2× digital zoom begins. This is illustrated:

70 mm×1.0=70 mm (EFL)
.
.
.
150 mm×1.0=150 mm—transition point
160 mm×1.2=192 mm
162 mm×1.24=~200 mm
170 mm×1.4=238 mm
180 min×1.6=288 mm
190 mm×1.8=342 mm
200 mm×2.0==400 mm The digital zoom transition point (i.e. the width of the upper range used to control digital zooming) might be user-settable based on how "fast" or sensitive (twitchy) they want the upper zoom ranges to be, versus uncompromised quality at a fairly high threshold. This may vary based on lenses, some of which are fast (with larger focal length changes for a given rotation amount). Lens focusing helicoids may be designed with slower angular responsiveness as a compromise for slower response at the natural lower end of the range without digital zooming, and a less twitchy response at the upper end where digital zooming occurs. Where cam profiles permit, a lens may be designed to be less responsive at the upper end to make upper-range digital zooming more natural and less twitchy.

Note that the user enjoying a 2× digital zoom to remain within quality limits in this example will be shooting at an EFL of 200 mm with an optical focal length of about 162 mm, as indicated by point 101, so that a digital zoom crop factor of only 81% (i.e. 162/200) is employed as compared to a pure optical zoom to 200 mm, having minimal effect on quality (well below quality threshold limits that tolerate a 50% crop or 2× zoom factor) is experienced, with the benefit of an intuitive system for transitioning to more digital zooming to a 2× factor yielding a useful 400 mm EFL.

Of course, lenses specially designed for cameras having these digital zoom capabilities may also be designed with sensors on the zoom ring for a user to invoke digital zooming beyond the normal optical range. This may be separated by a detent in the manner that some lenses with compact stowage position (e.g. Nikon Z 24-70 mm f4) have detents to prevent accidental zooming past the lower limit back to the non-functional range toward the stowage position. Such a lens might zoom from 70 mm to 200 mm, then past a detectable but light transition detent to enter the digital zoom range of the zoom ring rotation. The zoom ring may optionally be spring biased or otherwise motivated back to the transition detent.

The above system is discussed in terms of a simple lower range with no optical zoom up to a selected transition point, and an upper zoom range with a digital zoom factor linearly proportionate to the percentage the zoom setting exceeds the transition point in the range to the top zoom focal length. A graph of optical zoom setting shows this as a line segment 100 originating at the lowest focal length and extending up to a transition focal length 102 over which there is no optical zoom, and a second segment 104 extending from the transition point to the maximum zoom setting and maximum digitally zoomed EFL. Without the digital zoom function, the line 106 represents the EFL corresponding to the actual lens zoom setting.

Alternative profiles may have a first digital zoom ratio segment 110 of gentler slope initially, and a second digital zoom ratio segment 112 of steeper slope for more sensitive zooming at the top range while conserving quality and adjustment control at a lower portion of the digital zoom range. Alternatively, the profile may be any function such as a curved profile segment 114 in the upper range to avoid any sharp transitions. With curved profiles one may well apply these over more of the zoom range or even the entire zoom range.

It is noteworthy that the zones indicating the degree of digital zooming are above the lines 100 and 106, and below the respective zoom function curve or line. The advanced and preferred options 104 (linear in the upper range), 114

(curved), 110+112 (two slopes) illustrate how the amount of digital zooming is relatively limited over the operational range.

This principle of invoking digital zooming based on zoom lens focal length settings may be implemented in any system with an optical zoom lens to implement added digital zooming, even without the advantageous quality threshold limit benefits noted above. In such systems, the user would benefit as existing zoom lens focal range was effectively extended, but left to rely on their own judgement or preset limits as to the safe digital zoom degree that generates adequate quality images.

Further alternatives may simply implement a sudden maximum zoom at the very limit, or in response to specific user input such as "double-clicking" the zoom ring against the upper limit twice in succession or pressing another camera control in the manner that the user may magnify a portion of the viewfinder. The benefits of these systems are best enjoyed employing the digital zoom quality limits as discussed above.

Further alternatives for cameras designed with suitable sensors may include strain gauges at the lens control ring or lens mount that indicate that a lens ring is being torqued while at the limit of motion, and this used as a zoom control based on the degree of force or duration of force application.

One alternative may be employed with "zoom-by-wire" zoom lenses with control rings that are not mechanically coupled to lens components, but connected instead with position or motion encoders to the processor in the manner of many autofocus lenses. With such lenses, the programmable zoom ring could be enabled to provide a consistently smooth zooming effect that begins only when the optical zoom range is exhausted at the maximum and in which the transition may well be virtually undetectable to the user without other indicators, thus benefiting from the quality limits on digital zooming discussed above. This would avoid an accelerating effect or increased sensitivity to zoom ring effect at the upper end as would occur to a degree with line 112 of FIG. 2.

Focus Peaking.

Figure 4:
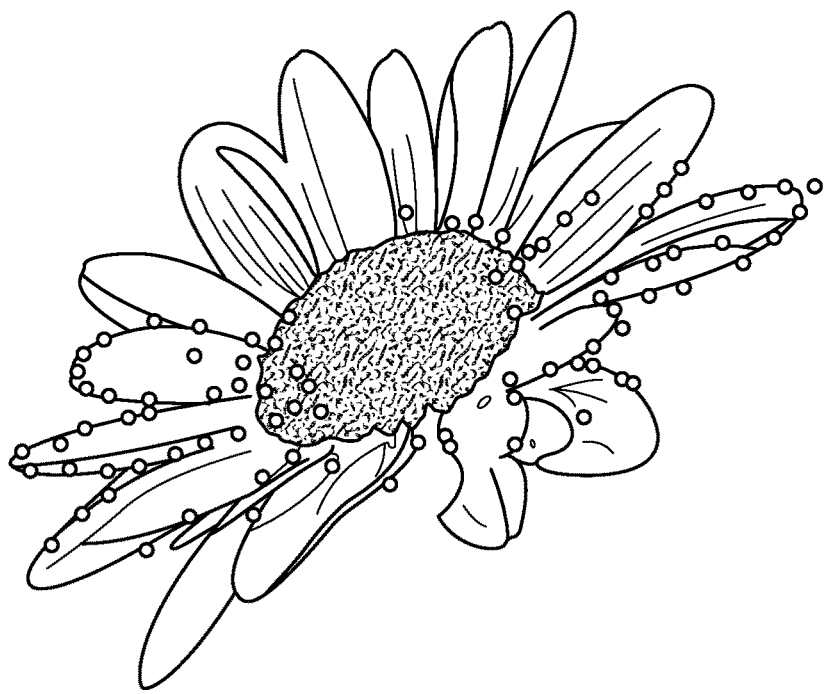
FIG. 4 Prior Art showing the system.

For use of manual focus lenses on conventional cameras with an electronic viewfinder the "focus peaking" feature is often very useful. However, it has some limitations. A user may set the sensitivity to a desired level, such as by selecting from among three sensitivity options (high, medium, low). At one extreme shown in Prior Art FIG. 4, the system indicates with viewfinder highlights that more points are in focus, giving a more visible and larger area to view, but tolerating slightly out-of-focus points as still in focus. This can be a concern for some subjects, such as if a portrait subject's hair and eyes are indicated, in focus, while the more important eyes are actually slightly out of focus.

In the illustration, the highlighted points are represented by dots, while in the existing system these are indicated in the electronic viewfinder by bright pixels of a selected color such as red for noticeability. At the other extreme, shown in Prior Art FIG. 3, the system is more discerning and accepts only the most precisely in-focus points. This extreme can be disadvantageous because when few points are highlighted it can be difficult to see when seeking the correct focus. Some subjects are better captured using low sensitivity, and some are better captured with high sensitivity (and others with medium sensitivity). This means that any given setting will be less than ideal for some subjects.

Figure 3:
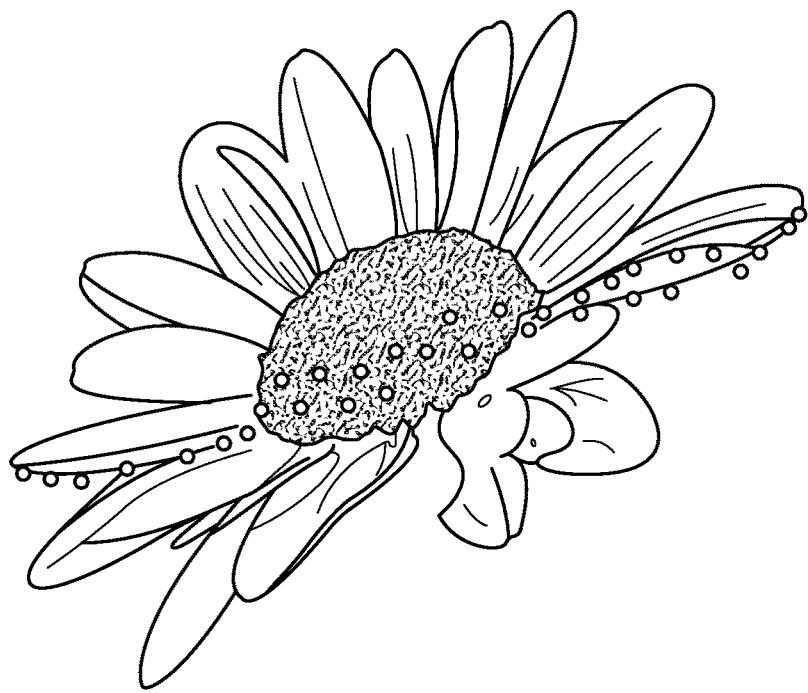
FIG. 3 Prior Art showing the system.
Figure 5:
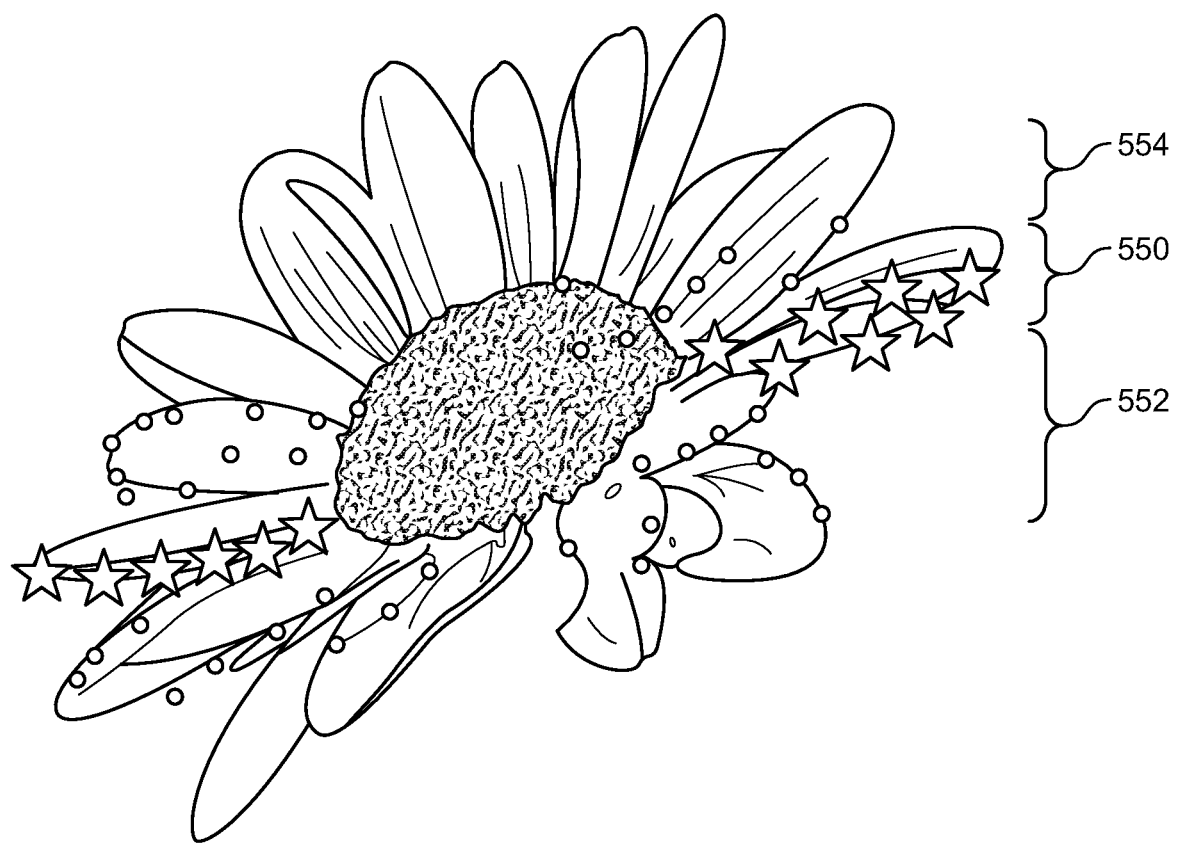
FIG. 5 illustrates an improvement of the system.

An improvement of this system is shown in FIG. 5, in which a subject is shown as displayed in an electronic viewfinder as the user is adjusting the manual focus setting of a mounted lens. A narrow central focus range associated with the focus peaking highlights of FIG. 3 is shown with star symbols indicating the most precise range of focus, generally in the zone 550 indicated in the figure. A broader nearer range 552 and farther range 554 outside of these indicated points are indicated in the figure with dots representing points of close but not precise focus, as associated with the points in FIG. 4 other than the central focus points of FIG. 3. In actuality, there are multitudes of pixels illuminated, and these are symbolized for simplicity only by the several stars and dots.

The narrow central focus points, and wider slightly out-of-focus points may be distinguished from each other in the viewfinder any of several different ways. For instance, the central focus points may be indicated by brighter points, or by flashing points, or by a different rate of flicker. More preferably, they may be indicated by color, such as central narrow focus points by green, and peripheral near-focus areas in yellow or red. Other color distinctions may be made in the saturation of a given color, or other color characteristics. The points nearer the camera than the focus points may optionally be distinguished from those beyond the point of focus to aid the user in selecting the focus direction. For instance, central narrow focus points may be indicated in white, while near and far can be indicated by red and blue (or green) respectively. Magenta and green corresponding to the effects of spherochromatism is another intuitive option that may be preferred by some users. The colors may further be enhanced by having the close focus range indicated by a combination of brighter luminance, and distinguishable hue.

Lens Adapter

Figure 6:
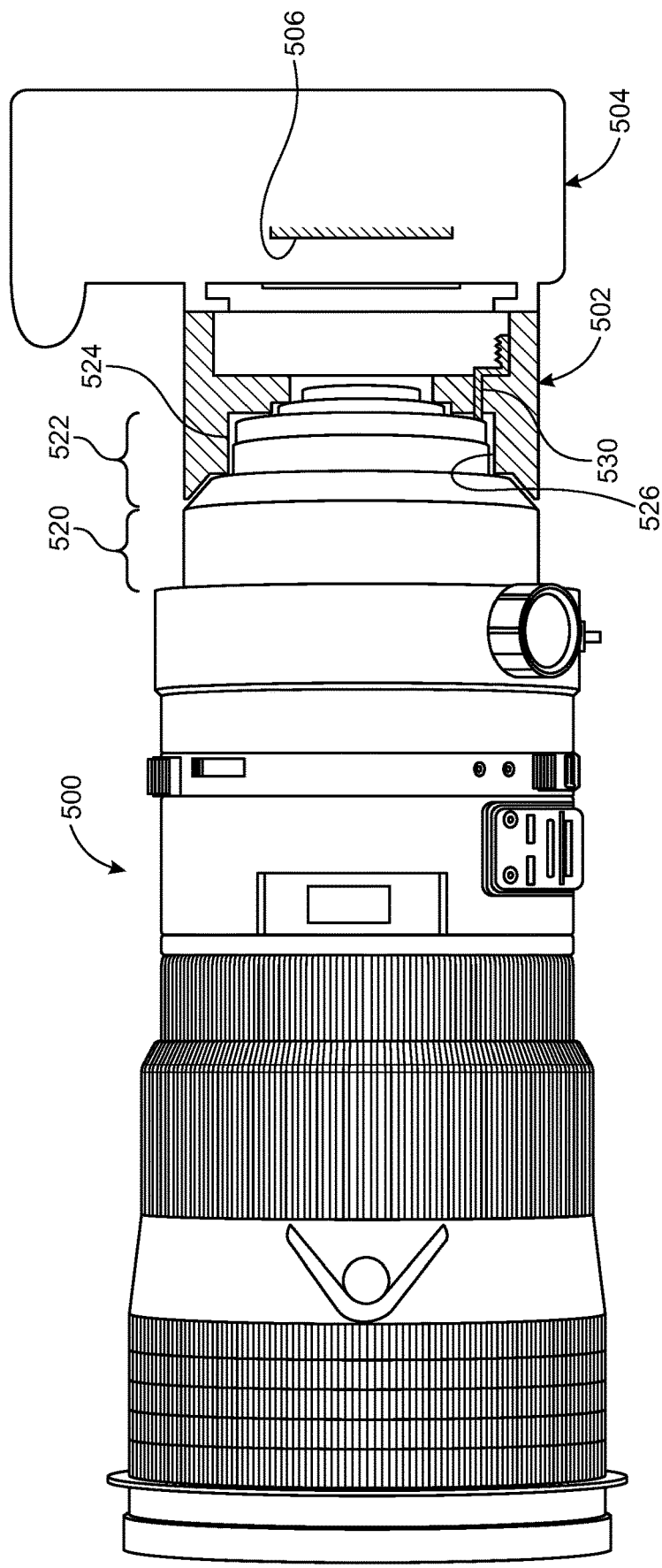
FIG. 6 is a top view of the lens.
Figure 7:
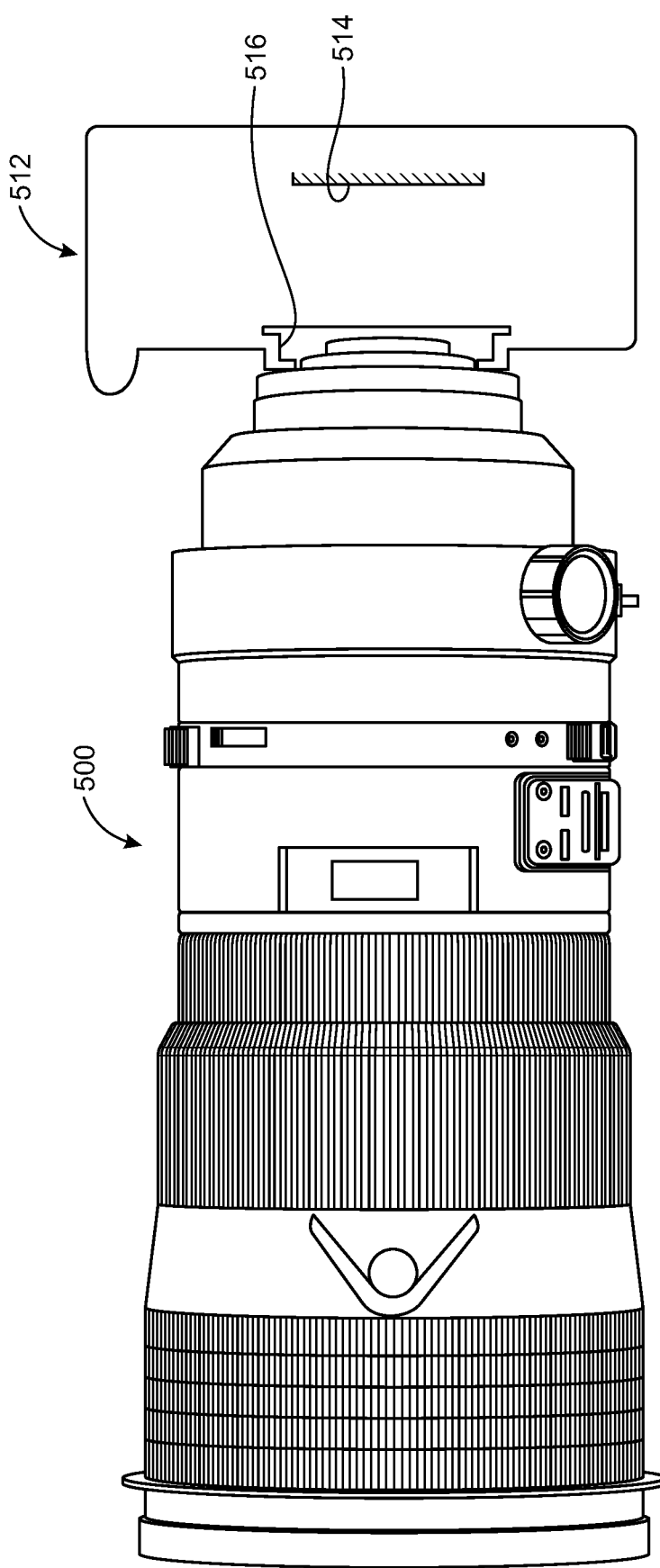
FIG. 7 is a top view of the lens.

FIG. 6 shows a lens 500 including a dedicated adapter 502 mounted to a mirrorless camera body 504. In the simplified system depicted, the lens may be a 300 mm Nikon F-mount telephoto lens, and the mirrorless body is a Nikon Z6 or Z7. The adapter has the essential elements of a conventional Nikon FTZ adapter, with a female forward mount mating with the F-mount of the lens, a rear male Z mount mating with the camera body's mount, and a mechanical distance to accommodate the known difference in image planes 506 between systems. FIG. 7 shows the lens 500 mounted directly to a DSLR camera body 512, with an image plane 514 and a lens mount 516. The adapter is not present because in contrast to most mirrorless bodies, a DSLR must have a flipping mirror between the lens and the image plane with a distance at least as great as the vertical dimension of the sensor. Other manufacturers such as Canon use different mount specifications and dimensions, but with similar concerns with larger and smaller mounts and the need for adapters.

Returning to FIG. 6, the Z mount associated with the rear of the adapter has a larger diameter than the F mount associated with the front. The Z mount affords optical design opportunities that may enable or require larger lens diameters and lens exterior diameters. However, if a lens maker wishes a lens to be usable with both mount formats, it has a diameter at the rear limited by the smaller F-mount. This may also be necessitated by the fact that F-mount bodies may have controls and other elements at a limited radius from the optical axis at the front of the body, and thus external diameters are limited adjacent to the mount. In the illustrated example, the lens has a larger diameter intermediate section 520 forward of a limited diameter rear portion 522 that is needed for usability with an F mount body. The adapter has a forward collar section 524 having an interior bore 526 that receives the lens section 522, and an exterior at that forward position that is sized and finished based on the lens portion 520. The collar section has a tapered rim that provides a flush or limited gap junction with the lens, and this may be gasketed to avoid incursion of dirt and moisture. Not shown is an option in which an internally threaded collar about the forward end of the adapter engages external threads at the rear of the lens section 520, which would necessitate a thread protector ring to cover the exposed threads on the lens for use on a DSLR without the adapter.

While existing adapters are suitable for existing lenses, the preferred embodiment adapted is intended to be designed with the lens as a removable dedicated adapter that creates a finished and integrated appearance when installed. For professional lenses costing $5000 or more, an adapter with an inconsistent appearance may be an unwanted disadvantage, and may limit the attractiveness of such lenses. A Z body owner may presume that a $10,000 lens requiring an adapter is not truly designed for his or her camera, and resist the purchase or switch to a brand that offers a seemingly dedicated lens.

Instead, the adapter is designed for the lens, and different such lenses may have different size and shape dedicated adapters. Instead of adding an adapter to an F-mount lens to use of a Z mount body, this is a system with a Z-mount lens that has an adapter that removes to convert it to an F mount lens. The removable item is perceived less as an adapter, but more as a simple conversion facility that adds nothing out of place. As illustrated, the adapter is shown with a common cylindrical diameter common to the lens section before it, but this exterior contour before and after the junction may be of any size and shape considered appropriate by the lens designer, and unconstrained by the needs for different lenses that the dedicated adapter is not expected to fit.

That said, some lenses with common design elements and sizes may be designed to use the same adapter. It is notable that existing adapters are made to adapt lenses of a wide range of different styles and dimensions as they have evolved over generations, so the use of a dedicated adapter designed for a particular lens is very different from an adapter designed to accommodate hundreds of different old lenses on a new camera body. It is also possible that aftermarket providers can offer functionally suitable adapters that are more aesthetically compatible with particular models of lens than are offers by lens makers if lens makers fail to perceive the benefit of dedicated adapters.

Figure 8:
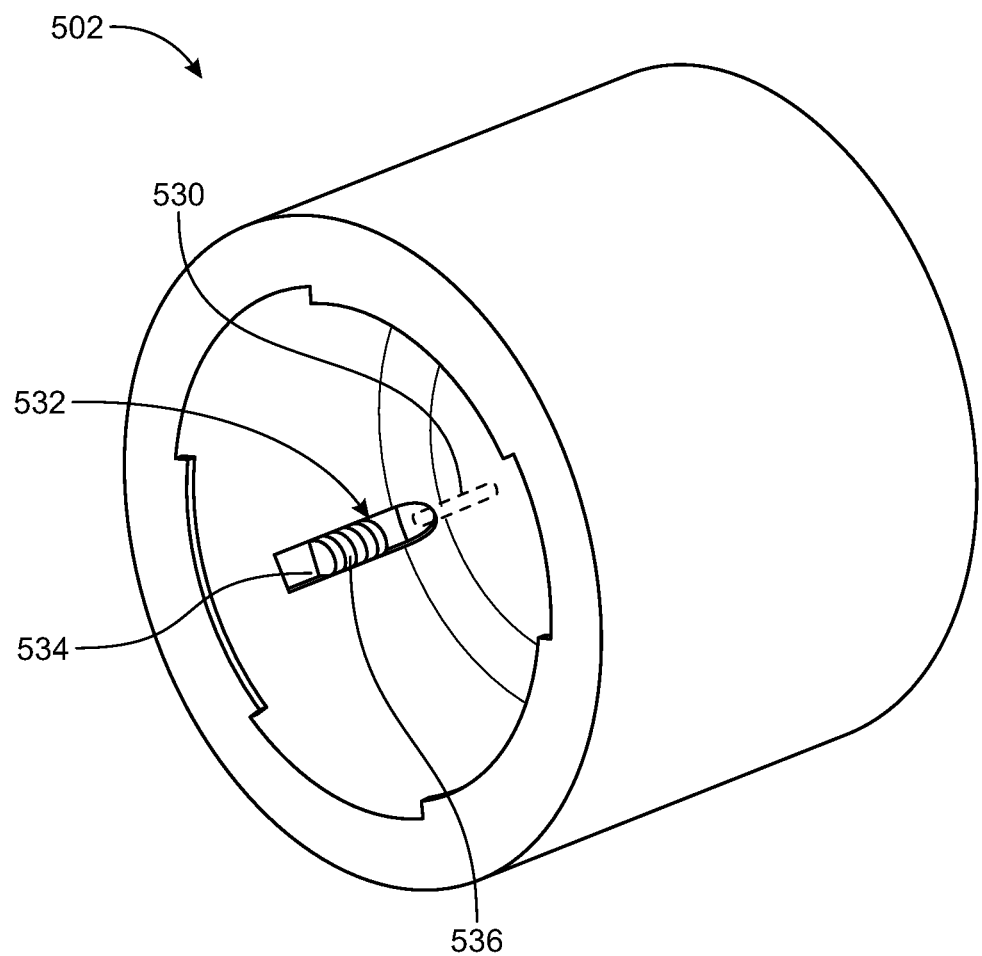
FIG. 8 is a perspective view of a latch in the interior of the adapter.
Figure 9:
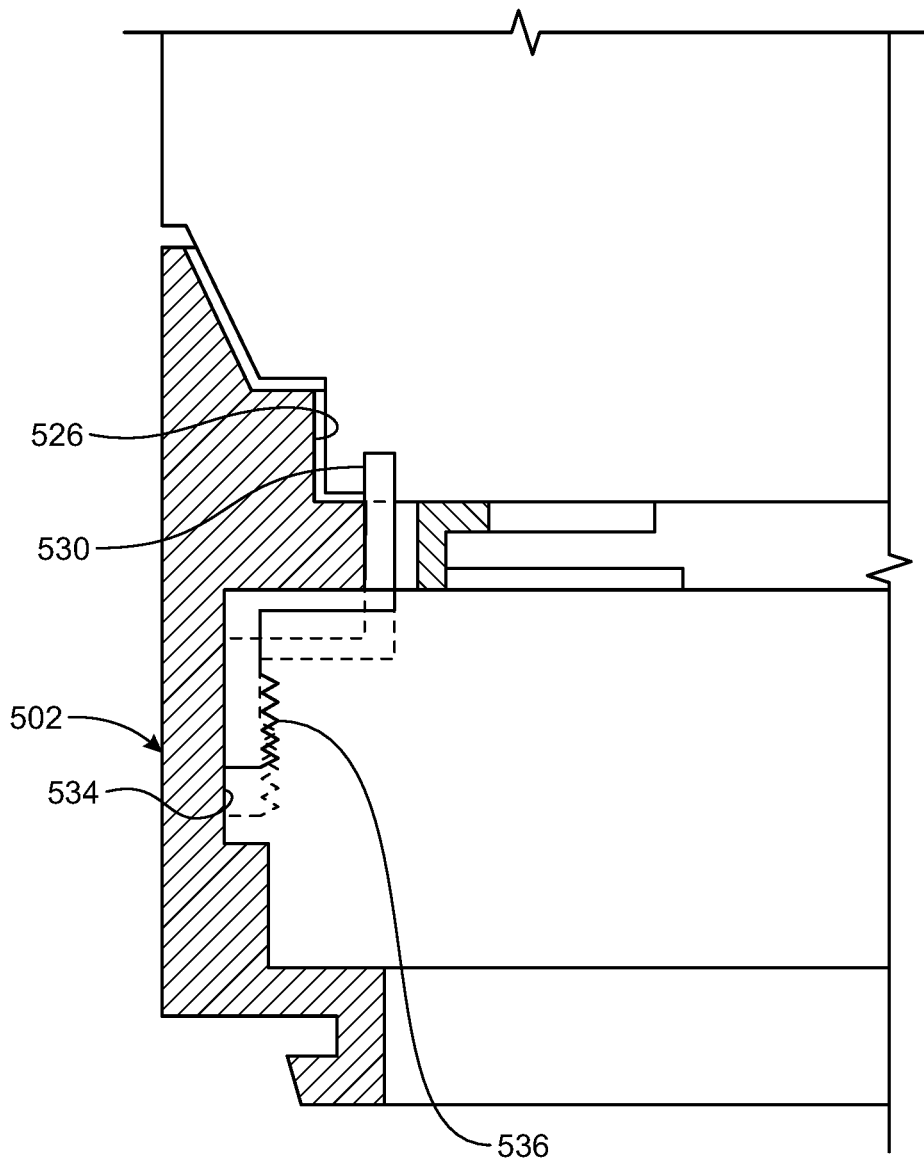
FIG. 9 is a simplified schematic view of a latch in the interior of the adapter.

With the adapter being dedicated, easy and frequent removal is neither necessary nor desirable. A user who must switch rapidly among lenses desires to avoid inadvertently detaching the lens from an adapter when readying the camera to switch to a lens not requiring an adapter, or to a lens with its own dedicated adapter. The depicted dedicated adapter 502 has a release facility that is not readily accessible when the lens is mounted to the body. As with conventional lens releases, a pin 530 is spring biased in a forward direction parallel to the optical axis of the lens into a pocket on the rear bayonet mount of the lens, and is retracted against the spring force to enable the lens to be rotated to a removable orientation. This is normally actuated with an external button or slider. In the preferred embodiment, as illustrated in FIGS. 8 and 9, a latch element 532 has a pin at the forward end, and a rear portion received in a channel 534 in the interior of the adapter. A textured actuator surface 536 allows a user to retract the latch to remove the adapter from the lens. This would normally be done only rarely, when the lens was to be used on an F mount body instead of a Z mount, such as for a photographer who had both body types. The inaccessibly of the latch when the lens is mounted prevents inadvertent detachment.

In alternative embodiments the latch or release/retention facility connecting the lens to the connector is made less accessible and less readily actuatable than a simple external button or slider. This may include external elements that require a tool, such as set screws or a button or slider in a recessed passage. Even if a tool is not required, a recessed access requiring a coin or fingernail, or two different actuators to be operated simultaneously will reduce the risk of inadvertent detachment. A fastener or several threaded fasteners may also be accessed internally only with the lens and adapter being detached from the camera, including replacing the F mount bayonet mount on the lens with an adapter that has a front plate that connects to the lens housing in the same manner as a bayonet mount.

Adapter Control.

Figure 10:
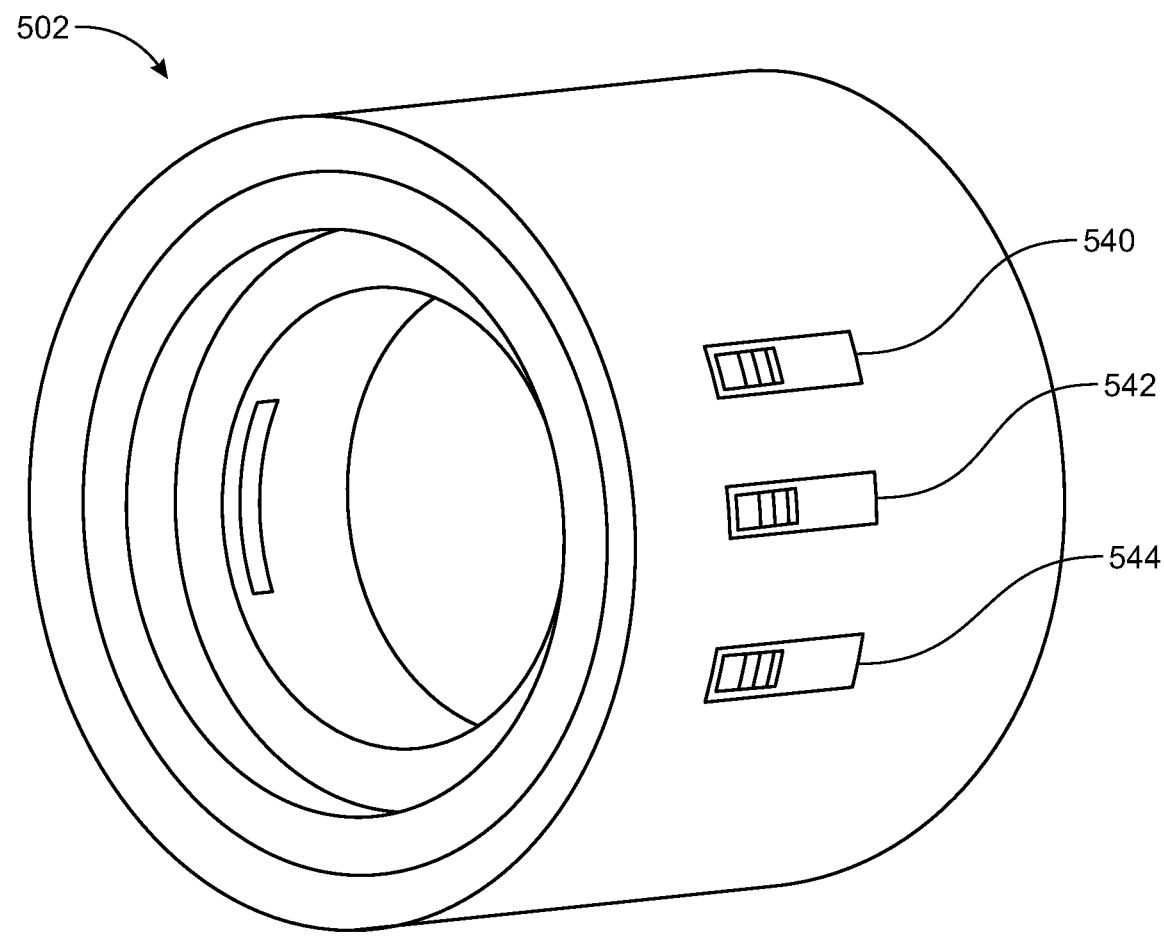
FIG. 10 is a perspective view of the adapter.

FIG. 10 shows that the adapter 520 has several electrical switches 540, 542, 544. While these are shown as two-position switches, they may be of any type with three or more positions or a range of positions. These switches are available for use only when the adapter is in place. When the lens is used without the adapter, they are of course unavailable. Therefore, they are preferably for functions associated with the use of the lens on a Z mount mirrorless body for which the adapter is needed. Such functions associated with mirrorless cameras and not DSLRs include the control of in-body image stabilization (IBIS), control of lens image stabilization systems in conjunction with IBIS, control of electronic viewfinder, control of digital zoom features disclosed elsewhere in this description, and features and control associated with future generation cameras.

Figure 11:
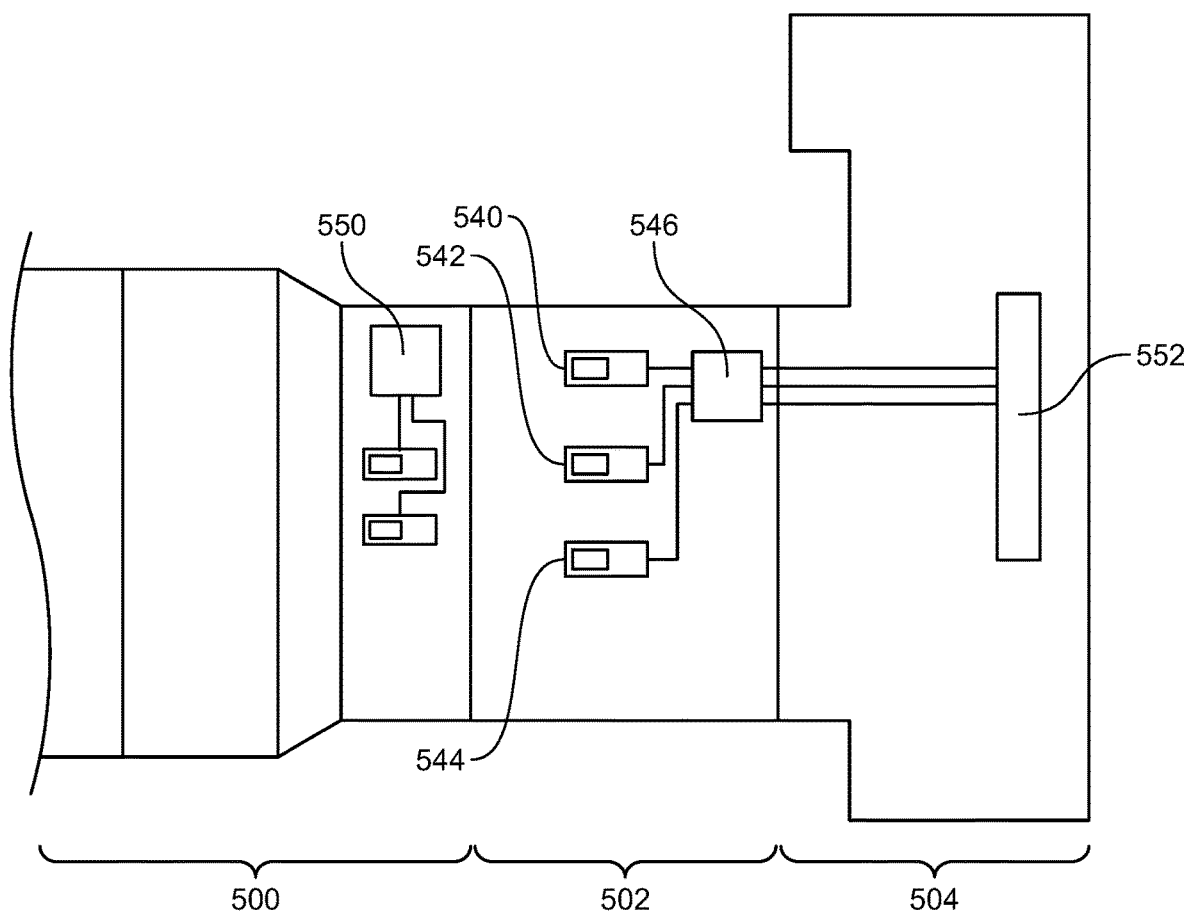
FIG. 11 is a simplified schematic view of the switches connected to an optional processor in the adapter.

As shown in FIG. 11, the switches 540, 542, 544 are connected to an optional processor 546 in the adapter, and may alternatively be connected via simple conductors either to a lens processor 550, or to a camera body processor 552, or both, via electrical contacts on the mount that are registered with lens and camera body contacts.

The adapter switches may be provided for added functions for which there is inadequate room on the camera body. Such switches on the body are normally user programmable for any selected function and these may be similarly programmed. For example, even with all the camera programmable switches set to other important functions, a switch on the adapter might provide a useful control associated with the lens. For a lens used for sports photography, a switch might control the focus tracking mode or shutter speed. These are preferably functions that aren't essential for utility of the lens on a body without the adapter, and preferably include functions that are of no utility on a DSLR camera that doesn't require the adapter. This not only avoids an impression of DSLR users getting less than all of the benefits, but provides such users the benefit of not seeing switches that are of no use to them.

The adapter may also include internal teleconverter optics that are switchable into and out of position in the optical path, optionally using an external mechanical or electrical switch.

An adapter with less than the normal thickness based on the different mount to image plane distances may be employed with an internal element that provides some to most of the accommodation to shift the distant point of focus for the DSLR variant to a short-distance mirrorless variant. This might well be done in a minimum thickness or 2-3 mm needed for each mount's mechanical dimensions, with the adapter's optical element extending somewhat rearward toward the imager, or forward into the throat of the rear of the lens.

Additional Adapter Embodiment

Figure 12:
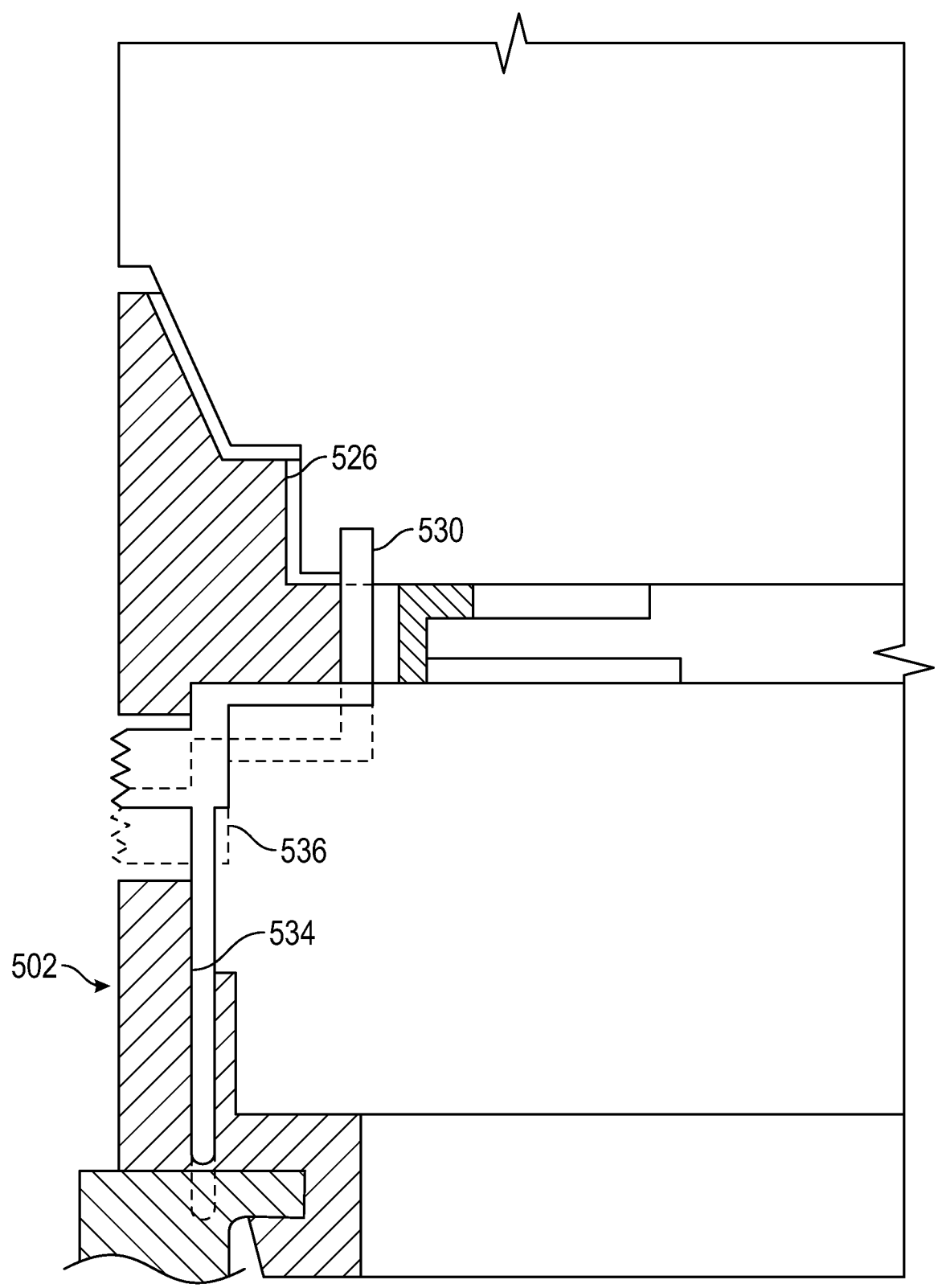
FIG. 12 is a simplified schematic view of an additional embodiment having of the adapter.

As discussed above with respect to FIG. 9, an additional embodiment is shown in FIG. 12, which depicts the adapter having an extended elongated latch element with a rear portion 554 received in a passage of the adapter body. When the latch is in the forward portion engaging the lens mount against rotation and removal from the adapter, the free end 560 of the rear end of the latch is recessed or protrudes only a limited amount from the adapter toward the camera body lens mount front surface 562. To move the latch out of engagement from the lens at the forward end is not possible when the adapter is on the body because the body lens mount blocks the rear end of the latch. This version would be less desirable for a user with many legacy lenses, and who might use a camera body with an essentially dedicated adapter. This is more likely for a user with the rare (or unusually expensive to replace) legacy lens that wishes to treat the adapter as essentially a dedicated modification of the lens. Other applications for either the external blocked embodiment or the internal actuated embodiment are for new lenses offered for both format mounts, with the lens sold with the adapter attached to be retained by mirrorless body users, and to be removed and set aside by SLR legacy body users. For that application, the internal actuator avoids visual clutter and taking up space that could be used by other controls.

Figure 13A:
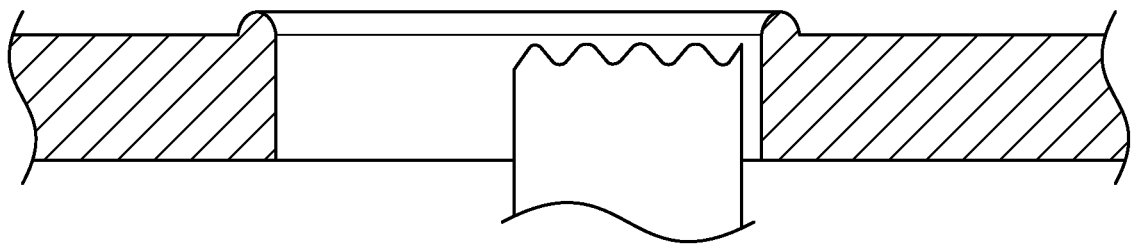
FIG. 13A is a simplified schematic view of a latch with an actuator recessed below the adjacent exterior surface of the adapter.
Figure 13B:
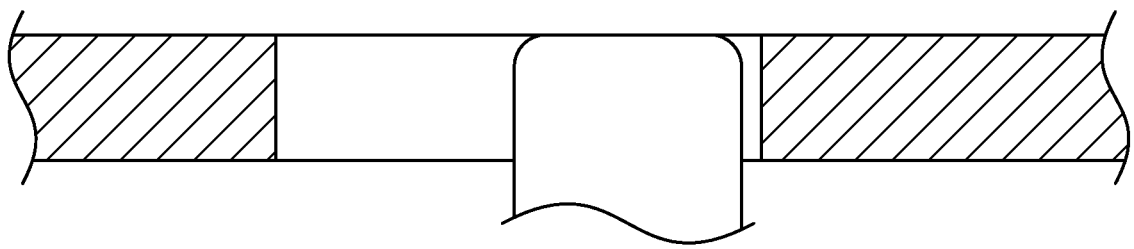
FIG. 13B is a simplified schematic view of a latch with an actuator flush with the adjacent exterior surface of the adapter.
Figure 13C:
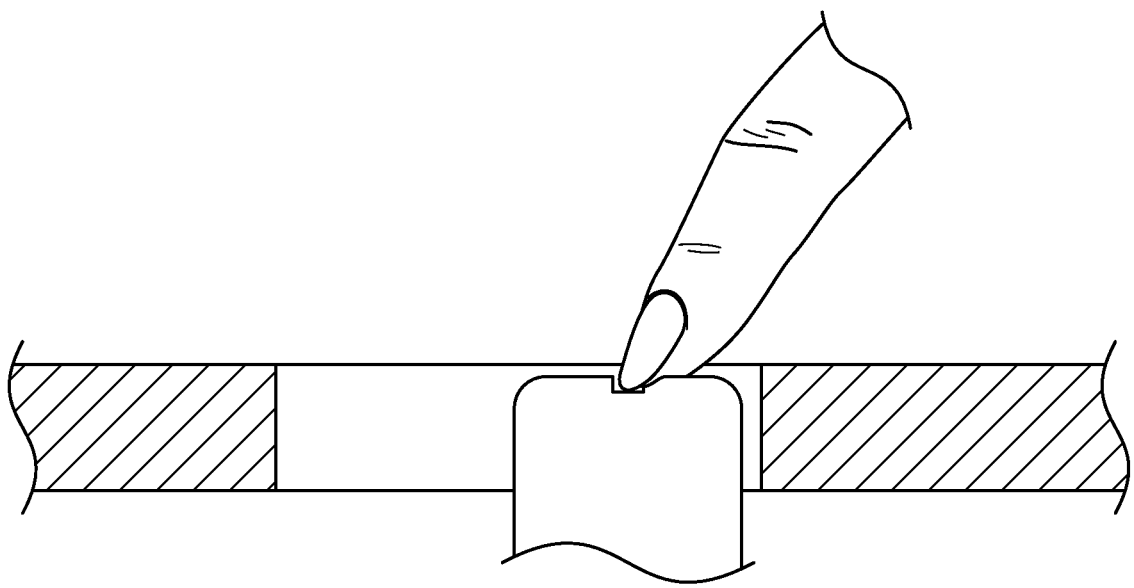
FIG. 13C is a simplified schematic view of a latch with an actuator recessed below the adjacent exterior surface of the adapter, and having a groove for engagement by a fingernail.

FIG. 13A shows a latch with an actuator recessed below the adjacent exterior surface of the adapter. FIG. 13B shows a latch with an actuator flush with the adjacent exterior surface of the adapter. FIG. 13C shows a latch with an actuator recessed below the adjacent exterior surface of the adapter, and having a groove for engagement by a fingernail as shown, or another tool or implement other than an ordinary fingertip.

Still Image Capture During Video

Figure 14:
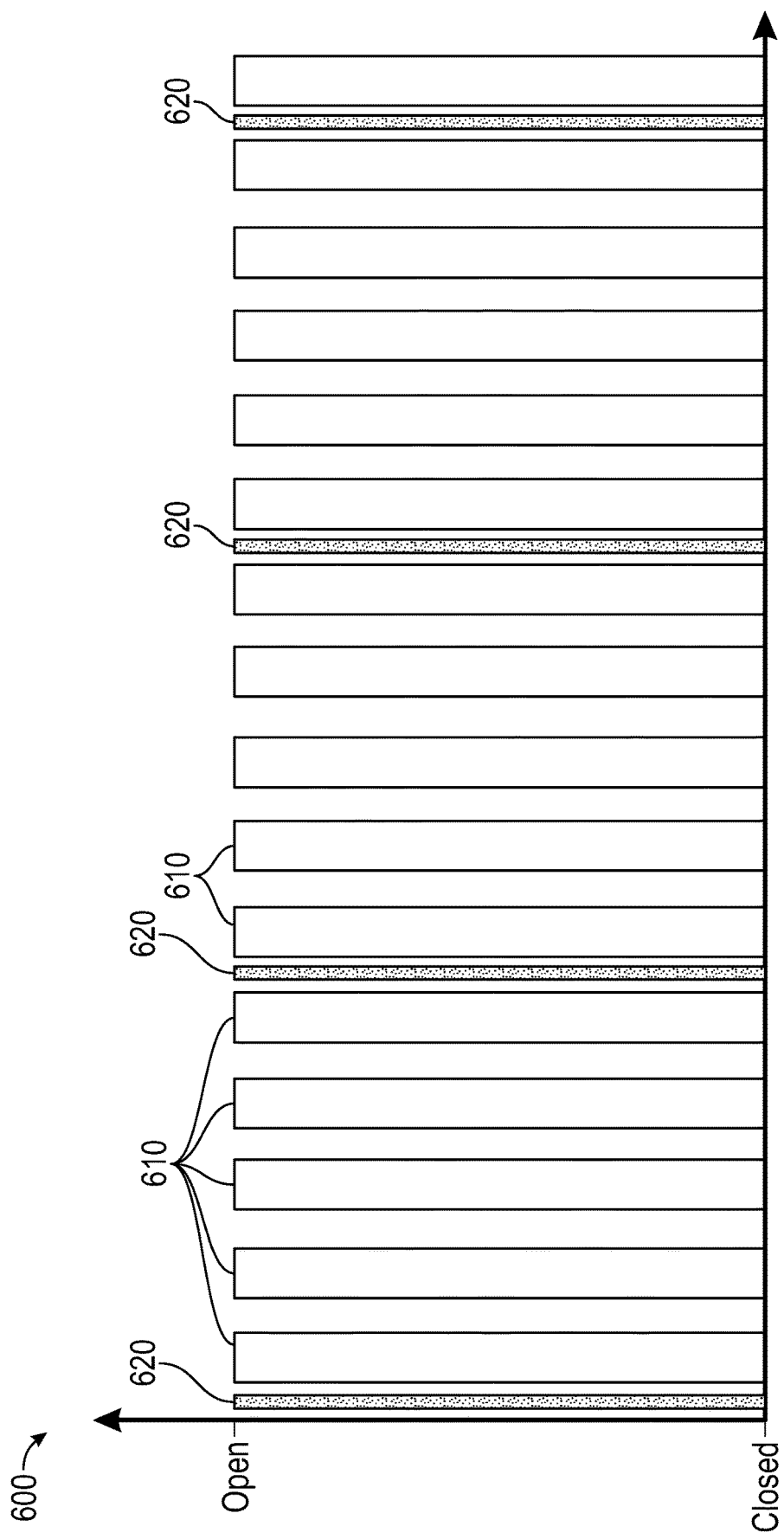
FIG. 14 shows a graph depicting a system that addresses a trade-off in high-performance cameras.

FIG. 14 shows a graph depicting a system that addresses a trade-off in high-performance cameras. Modern cameras have increasingly greater resolution and frame rates, and can capture very high-resolution video (such as 8K). It is said that such video enables users to shoot a scene in video, and then "grab" frames of sufficiently high resolution for most publishing and enlargement purposes. While this is workable when there is little or only gradual subject motion (such as a bride descending a staircase), it can be problematic for greater subject motion and action scenes such as sports and active children.

Video and film normally use longer duration exposures for each frame than a still photographer might use to stop action for a desirable still shot. It is understood that a typical or classic film look is achieved by having the shutter open for a duration equal to half of the time interval between frames. Thus, a 24 frames per second (FPS) movie camera would use a "shuttle angle" of 180 degrees, for an exposure duration of $\frac{1}{48}$ second. Video may use higher effective frame rates of $\frac{1}{60}$ or $\frac{1}{120}$ second and generate shorter duration exposures of each frame if following the above standard. This generates a look in which motion appears naturally blurred, and reflects normal perceptions of live reality. When frame durations get much shorter than this, the moving image develops a jerky or stroboscopic appearance. Sports photographers may prefer shutter durations of $\frac{1}{1000}$ second or faster (often up to $\frac{1}{8000}$ second) to freeze motion, and may have equipment to generate images at a frame rate of 20-24 frames per second with present preferred products. But just as a sequence of frames that looks right as a moving image will generate poor still images when frozen motion is desired, a sequence at film and video rates that limit subject blur will generate a unnaturally stylized-looking moving image.

This trade off leaves users to decide in advance whether they are prioritizing moving image capture of still image capture, with only limited subjects enabling capture of both. FIG. 14 shows a chart 600 depicting an example of the operation of a camera system having convention processor and other hardware, and the ability to capture images of any duration at any time in any sequence. This may be done with any type of shutter, but electronic shutters with high speed capability are believed to be presently most practical.

In the chart, the X axis is time-based, and the Y axis is the shutter condition, with zero being closed, and an upper level indicating open. This shows as a square wave as shutters are effectively instantaneous to open and close in the depicted, model, although actual shutter may have some other effects that mean that the graph is an idealized depiction of effective shutter speeds.

The graph shows that video/film moving image frames 610 have a duration of about half their period (reciprocal of frame rate), and this may range from 10-20% to provide some desired motion blur to 20-40% when more blur is needed, to 40% to as nearly 100% as the system permits mathematically. It is during the intervals between video frames that high-speed action-freezing still frames are captured.

Shorter duration still frames 620 are shown as being captures at every 5th video frame. These may be captured at every frame when system capabilities permit the higher flow of data and potential heat effects of processing the data. However, the periodic interval may be selected at any periodic division of the video frame rate. A camera shooting 24 FPS video for a film look may well also practically capture 24 FPS of still frames, but this may be close to an extreme limit. Notably, the slowest video frame rates such as 24 FPS are the ones that generate the poorest still shots to freeze action.

The duration of the still images 620 is shown for simplified clarity as being about $\frac{1}{3}$ the duration of the "gap" between video frames, or $\frac{1}{6}$ of the video frame rate (or $\frac{1}{3}$ of the video frame duration). For 24 FPS this is a $\frac{1}{144}$ second ($\frac{1}{3}$ of $\frac{1}{48}$) shutter speed. Far more likely is that a user will select an even faster still shutter speed, which on the graph may look like too narrow a bar to distinguish from a thin vertical line. IN extreme cases where some still motion is desired, the still frame duration may be as much as half the video frame duration, but in more cases, it will be more than the $\frac{1}{3}$ depicted. A still frame duration of $\frac{1}{10}$ that of the video frame duration ($\frac{1}{20}$ of the reciprocal of the frame rate) would generate $\frac{1}{480}$ second images at 24 FPS (180 degree shutter angle), $\frac{1}{1200}$ second images at 60 FPS, and $\frac{1}{2400}$ second images at 120 FPS. These are in the useful range for action photographers to stop motion, and suggest that $\frac{1}{5}$ to $\frac{1}{10}$ is an effective ration at which the benefits of the system accrue for many users.

A 240 FPS slow motion video rate permits only $\frac{1}{480}$ interval between frames with a 180 degree shutter angle, but with a 5-10× speed factor (video frame duration divided by still frame rate) still frames of $\frac{1}{4800}$ to $\frac{1}{9600}$ may be beneficial for even extreme cases in which the $\frac{1}{480}$ native video frame duration was inadequately blurry.

Also, the number of video frames between each still frame may vary and be selected by the user. This primarily is determined by the still frame rate desired by the user. For 24 FPS a user may wish to shoot still images each frame, or every other frame. For 240 FPS the preference may be 1 in 10 frames, or 1 in 20 or even less frequent such as 1 per second simply to capture only occasional reference images.

The graph shows that the initial image is the briefer still images, but this may be set at any desired position. In a simple case, a single still frame is captured at the outset, but the preferred embodiment includes periodic still image capture.

In the preferred embodiment, the system uses every video frame at the normal rate without interruption. In alternative embodiments with technical limitations, every nth video frame may be alternatively shot as a shorter still frame, and the effect is likely to be imperceptible for most applications. To accommodate this variation, the briefer still frame may be processed with imputed motion blur based on a comparison with adjacent frames, or may be replaced with an interpolated hybrid of the frames before and after, possibly also based on the data within the still frame.

The invention claimed is:

1. A lens adapter for interconnecting a lens with a lens mount to a camera body with a body mount, the adapter comprising:
   an adapter body having a forward portion and an opposed rear portion;
   the forward portion having a forward mount configured to mate with the lens mount;
   the rear portion having a rear mount configured to mate with the body mount;
   a latch connected to the adapter body, and movable between an engaged position in which the latch engages the lens and prevents rotation of the lens with respect to the adapter and separation of the adapter from the lens, and a disengaged position in which the latch is clear of engagement with the lens, and enables rotation of the lens with respect to the adapter and separation of the adapter from the lens; and
   a user-actuated actuator connected to the latch and inoperable for user-actuation when the adapter is connected to the body and to the lens.

2. The adapter of claim 1 wherein the adapter body defines an interior space, and the actuator is located in the interior space, the actuator being accessible only internally when the adapter is detached from the body.

3. The adapter of claim 1 wherein the adapter includes optical teleconverter elements.

4. The adapter of claim 1 wherein the actuator is external to the adapter body and does not protrude from an exterior surface of the adapter body to avoid inadvertent actuation.

5. The adapter of claim 4 wherein the actuator is flush with the exterior surface.

6. The adapter of claim 4 wherein the actuator is recessed with respect to the exterior surface.

7. The adapter of claim 4 wherein the actuator has a smooth exposed surface portion to limit actuation.

8. The adapter of claim 4 wherein the actuator defines a tool engagement feature configured to enable actuation of the actuator by a tool other than a finger pad, and not be readily engaged by a finger pad.

9. The adapter of claim 8 wherein the tool engagement feature is a recess.

10. The adapter of claim 8 wherein the tool is a fingernail.

11. The adapter of claim 1 including an interlock element responsive to whether the adapter is mounted to a body, and operably connected to the latch to prevent movement of the latch from the engaged to the disengaged position unless the adapter is free of a connected camera body.

12. The adapter of claim 1 wherein the latch is an elongated body having a front end configured to selectably engage the lens, and a rear end operably responsive to the presence of an attached body to prevent movement of the latch to the disengaged position when the adapter is mounted to the camera body.

13. A lens adapter for interconnecting a lens with a lens mount to a camera body with a body mount, the adapter comprising:
   an adapter body having a forward portion and an opposed rear portion;
   the forward portion having a forward mount configured to mate with the lens mount;
   the rear portion having a rear mount configured to mate with the body mount;
   a latch connected to the adapter body, and movable between an engaged position in which the latch engages the lens and prevents rotation of the lens with respect to the adapter and separation of the adapter from the lens, and a disengaged position in which the latch is clear of engagement with the lens, and enables rotation of the lens with respect to the adapter and separation of the adapter from the lens; and
   the latch being inoperable when the adapter is connected to the body and to the lens.

14. The adapter of claim 13 wherein the adapter includes optical teleconverter elements.

15. The adapter of claim 13 including an interlock element responsive to whether the adapter is mounted to a body, and operable contact the body to prevent movement of the latch from the engaged to the disengaged position unless the adapter is free of a connected body.

16. The adapter of claim 13 wherein the latch is an elongated body having a front end configured to selectably engage the lens, and a rear end operably responsive to the presence of an attached body to prevent movement of the latch to the disengaged position when the adapter is mounted to a body.

17. The adapter of claim 16 wherein the rear end of the latch protrudes rearwardly from the adapter body when detached from a camera body and when the latch is in the disengaged position.

18. A lens adapter for interconnecting a lens with a lens mount to a camera body with a body mount, the adapter comprising:
   an adapter body having a forward portion and an opposed rear portion;
   the forward portion having a forward mount configured to mate with the lens mount;
   the rear portion having a rear mount configured to mate with the body mount;
   a latch connected to the adapter body, and movable between an engaged position in which the latch engages the lens and prevents rotation of the lens with respect to the adapter and separation of the adapter from the lens, and a disengaged position in which the latch is clear of engagement with the lens, and enables rotation of the lens with respect to the adapter and separation of the adapter from the lens; and
   a user-actuated actuator connected to the latch and inaccessible for user-actuation when the adapter is connected to the body and to the lens.

19. The adapter of claim 18 wherein the actuator is recessed with respect to the exterior surface.

20. The adapter of claim 19 wherein the actuator defines a tool engagement feature configured to enable actuation of the actuator by a tool other than a finger pad, and not be readily engaged by a finger pad.

* * * * *